(12) United States Patent  
Merrill et al.

(10) Patent No.: US 8,548,326 B2  
(45) Date of Patent: Oct. 1, 2013

(54) OPTICAL COMMUNICATION SYSTEM

(75) Inventors: Brian R. Merrill, Waterford, MI (US); Philip Chamberlain, Otter Lake, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 230 days.

(21) Appl. No.: 13/069,634

(22) Filed: Mar. 23, 2011

(65) Prior Publication Data

US 2012/0243867 A1 Sep. 27, 2012

(51) Int. Cl.  
*H04B 10/20* (2011.01)  
*H04B 10/00* (2013.01)

(52) U.S. Cl.  
USPC .................. 398/63; 398/58; 398/70; 398/138

(58) Field of Classification Search  
USPC ....... 398/58, 63, 66, 67, 70, 71, 72, 135–139; 385/46, 47  
See application file for complete search history.

(56) References Cited

U.S. PATENT DOCUMENTS

| | | | |
|---|---|---|---|
| 4,380,394 A | 4/1983 | Stowe | |
| 4,446,515 A * | 5/1984 | Sauer et al. | 709/252 |
| 4,834,485 A | 5/1989 | Lee | |
| 4,955,086 A | 9/1990 | Kindt | |
| 5,500,763 A * | 3/1996 | Ota | 359/333 |
| 5,742,717 A * | 4/1998 | Saitoh | 385/46 |
| 5,801,861 A * | 9/1998 | Majima | 398/95 |
| 6,369,937 B1 | 4/2002 | Verber et al. | |
| 6,707,959 B2 | 3/2004 | Ducellier et al. | |
| 2003/0090161 A1 | 5/2003 | Marlow et al. | |
| 2005/0254752 A1 | 11/2005 | Domash et al. | |
| 2005/0265660 A1 | 12/2005 | Miller | |

* cited by examiner

*Primary Examiner* — Danny Leung  
*Assistant Examiner* — Daniel Dobson  
(74) *Attorney, Agent, or Firm* — Frederick A. Krieger

(57) ABSTRACT

An optical communication system is disclosed. The optical communication system includes a reflection hub connected to a plurality of communication modules. The communication modules communicate optical signals to one another via two way light channels, such that an optical signal is scattered off a diffuse surface at a distal end of the reflection hub and into the two way light channel of each communication module.

16 Claims, 4 Drawing Sheets

OPTICAL COMMUNICATION SYSTEM

FIELD OF THE INVENTION

The present invention relates to an asynchronous optical communication system that utilizes a reflection hub to reflect optical signals from a communication module to other communication modules.

BACKGROUND

Optical communication systems utilize pulses of light, i.e. optical signals, through light channels or fiber optic cables in order to transmit data packets between devices. Traditionally, a transmitter will transmit an optical signal through the fiber optic cable to a receiver. The fiber optic cables operate in a one-way mode, such that a fiber optic cable can be used for transmitting or receiving but not both. Further, in order to route the optical signals throughout a network, devices such as switches and cross-connects must be used, as well as sophisticated clocking and multiplexing techniques. Additionally, in traditional optical communication systems, each communication module will require at least two fiber optic cables extending from a communication module of the device to effectuate two way communication for the device, i.e. one cable for transmitting and a second cable for receiving. Further, if direct two-way communication between devices is sought, each device will have 2*(N−1) fiber optic cables extending therefrom.

Thus, while transmission by optical signals does provide for high transmission rates, the drawbacks of traditional fiber optic communication systems make fiber optic communication systems impractical for smaller confined networks, such as LANs or vehicle communications systems, e.g. CANs. Thus, there is a need for an asynchronous optical communication system.

SUMMARY

In one aspect of the disclosure, an optical communication system is disclosed. The optical system comprises a plurality of communication modules, each communication module operable to receive and transmit optical signals via a light channel. The optical system further comprises a reflection hub having a diffusive surface at a distal end, wherein the reflection hub receives the light channels of the plurality of communication modules at a proximate end of the reflection hub. When one of the plurality of communication modules transmits an optical signal through a corresponding light channel, the optical signal is scattered off of the diffusive surface of the reflection hub into the light channels corresponding to the other of the communication modules of the plurality of communication modules, such that the transmitting communication module broadcasts the optical signal to the plurality of communication modules.

In another aspect of the disclosure, an optical communication system is disclosed. The optical system comprises a first communication module operable to receive and transmit optical signals via a first light channel, a second communication module operable to receive and transmit optical signals via a second light channel, and a third communication module operable to receive and transmit optical signals via a third light channel. The optical system further comprises a reflection hub having a diffusive surface at a distal end of the reflection hub and receiving the first light channel, the second light channel and the third light channel at a proximate end of the reflection hub. When the first communication module transmits an optical signal through the first light channel, the optical signal is scattered off of the diffusive surface of the reflection hub and into the first light channel, the second light channel and third light channel, such that the optical signal is broadcast to the first communication module, the second communication module and the third communication module.

Further areas of applicability of the teachings of the present disclosure will become apparent from the detailed description and the drawings provided hereinafter. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

The description herein makes reference to the accompanying drawings where the reference numerals refer to like features throughout the several views.

DETAILED DESCRIPTION

Figure 1:
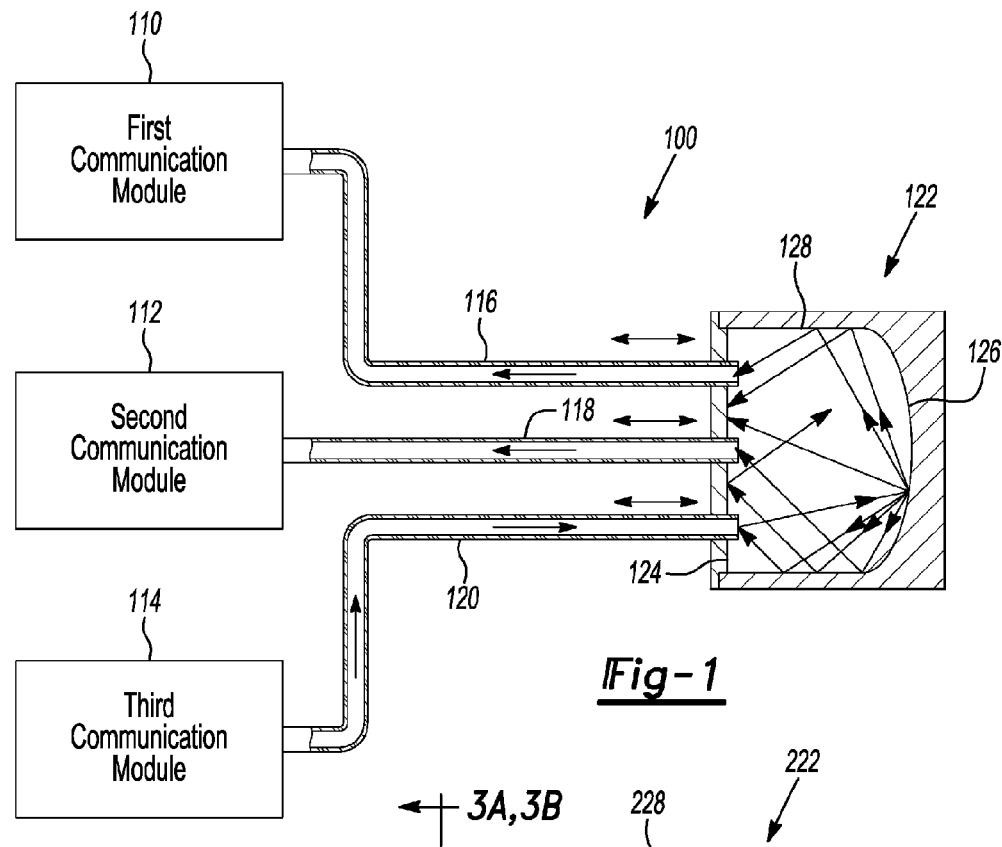
FIG. 1 illustrates an exemplary configuration of an optical communication system and the components thereof in accordance with the teachings of the present disclosure.

Referring to FIG. 1, an exemplary optical communication system 100 is depicted. The optical communication system 100 can be implemented in a variety of applications. For instance, the optical communication system 100 can be used as a vehicle bus, e.g. a controller area network (CAN), or a local area network (LAN). The optical communication system 100 allows different components or devices of a network to communicate with one another. Accordingly, each device or component in the network is equipped with a communication module that is operable to receive and transmit optical signals. In the exemplary optical communication system 100, a first communication module 110, a second communication module 112, and a third communication module 114 are depicted. It is appreciated that any number of devices or components may communicate using the optical communication system 100, but for purposes of description, three communication modules are shown.

Extending from each communication module is a light channel. For instance, a first light channel 116 extends from the first communication module 110, a second light channel 118 extends from the second communication module 112, and a third light channel 120 extends from the third communication module 114. The light channels 116, 118, and 120 provide a medium through which an optical signal can travel. The light channels 116, 118, and 120 can be made of any medium that can channel or reflect light. For instance, in an exemplary embodiment, the light channels 116, 118, and 120 are made of fiber optic cable. The light channels 116, 118, and 120 can be made of any suitable glass fiber optic cable or plastic fiber optic cable.

The light channels 116, 118, and 120 extend into a reflection hub 122, such that the light channels 116, 118, and 120 extend into a proximate end 124 of the reflection hub 122. The reflection hub 122 is an enclosed medium that has a diffusive surface at the distal end 126. In some embodiments, a distal end 126 of the reflection hub 122 is convex. The reflection hub 122 diffusively reflects, or scatters, the optical signals that are emitted from the light channels 116, 118, and 120. The scattered reflections are reflected randomly inside the reflection hub 122 and into the light channels 116, 118, and 120. The light may also reflect of an intermediate section 128 of the reflection hub 122 before entering the light channels 116, 118, and 120. The optical signal is then transmitted through the light channels 116, 118, and 120 and to the communication modules 110, 112, and 114.

In the example provided in FIG. 1, the third communication module 114 has transmitted an optical signal through the third light channel 120. The optical signal is diffusively reflected, or scattered, off of the reflective surface of the reflection hub 122. The result is that a plurality of optical signals are reflected throughout the reflection hub 122. While five reflected light beams are shown, it is appreciated that there may be many more reflected light beams. The reflected light beams are scattered randomly, and as shown in FIG. 1, at least one beam is reflected into each of the light channels 116, 118, and 120. The communication modules 110, 112, and 114 each receive the reflected signals. As will be discussed in greater detail below, the communication modules 110, 112, and 114 receive the optical signals and can determine if the message was intended for the receiving communication module and which communication module transmitted the message.

Figure 2:
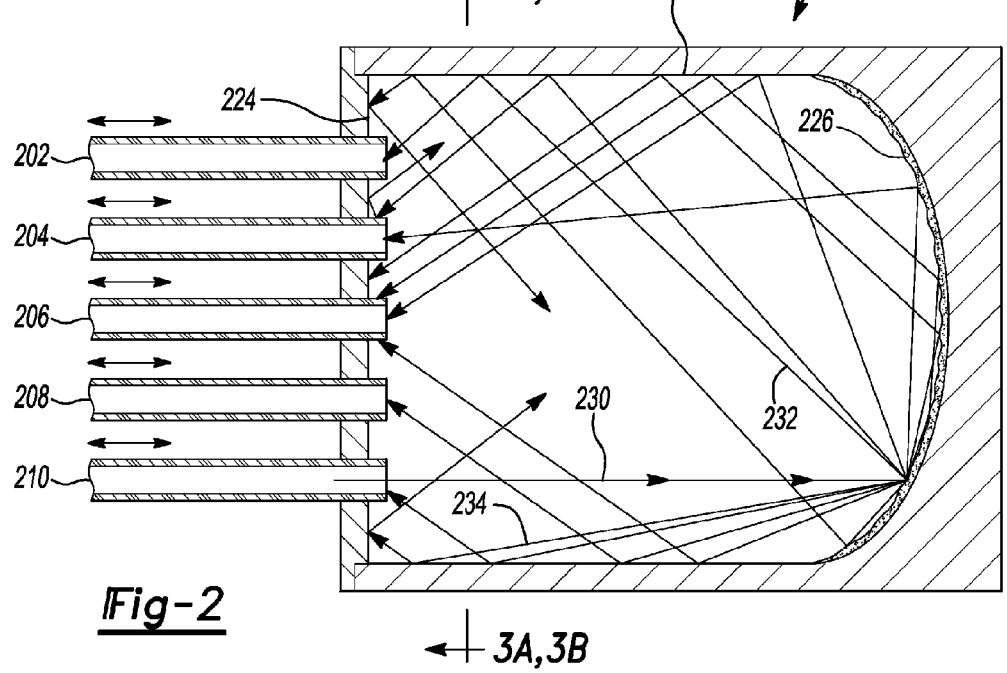
FIG. 2 is a perspective view of an exemplary reflection hub in accordance with the teachings of the present disclosure.

Referring now to FIG. 2, an exemplary reflection hub 222 is depicted. The reflection hub 222 has three sections, a proximate end 224, an intermediate section 228, and a distal end 226. The distal end 226 is located opposite to the light channels 202, 204, 206, 208, and 210. The distal end 226 can be made of a diffusive material, or can be coated with a diffusive coating. For instance, the exemplary distal end 226 is coated with a metallic coating, such that when light, i.e. the optical signal 230, is reflected off the distal end 226, a plurality of light beams 232 and 234 are reflected throughout the reflection hub 222.

At least a portion of the reflected light beams are reflected off of the intermediate section 228 of the reflection hub 222. The intermediate section 228 can be any reflective surface suitable for reflecting the optical signal. For instance, the exposed surface of intermediate section 228 can be made of glass fiber optic material, such as silica. Other types of glass, such as fluorozirconate, fluoroaluminate, and chalcogenide glasses can also be used. Furthermore, the intermediate section 228 can be made of plastic fiber optic material, such as step-index multimode fiber. In some embodiments, the reflection hub 222 is made of the same material as the light channels. In some of these embodiments, the distal end 226 and the proximate end 224 can be coated with different materials depending on the desired reflective properties of the distal end 226 and the proximate end 224. For instance, the distal end 226 may be coated with a material that reflects light diffusively, while the proximate end 224 may be uncoated or coated with a material that reflects light spectrally.

The proximate end 224 receives the light channels 202, 204, 206, 208, and 210. The light channels 202, 204, 206, 208, and 210 are inserted in the proximate end 228 such that the ends of the light channels 202, 204, 206, 208, and 210 extend slightly past the proximate end 224 of the reflection hub 222, e.g. less that 5 mm, or are flush with the proximate end 224. As shown in FIG. 2, the ends of light channels 202, 204, 206, 208, and 210 extend past the proximate end 224 of the reflection hub 22 such that reflected light 234 that does not enter the light channels 202, 204, 206, 208, and 210 is reflected into the proximate end 224 of the reflection hub 222. In other embodiments, the light channels 202, 204, 206, 208, and 210 are flush with the inner surface of the proximate end 224 of the reflection hub 222. Further, the proximate end 224 of the reflection hub 222, as well as the outer surface of the light channels 202, 204, 206, 208, and 210 can be made of or coated with light reflecting material. The proximate end 224 of the reflection hub 222 is coated with a light reflecting material to ensure that light is reflected back towards the distal end 226 when it reaches the proximate end 224. Thus, in these embodiments, light will either enter the light channels 202, 204, 206, 208, and 210 or will be reflected by at the proximate end 224 of the reflection hub 222. It is noted that the proximate end 224 can be comprised of or coated with the same material as the distal end 226 and/or the intermediate end 228, or can be comprised of or coated with a material with different reflective properties.

In the example provided in FIG. 2, the optical signal is transmitted as a pulsating light beam 230 from the light channel 210. The light beam 230 is scattered off of the distal end 226 and a plurality of light beams 232 and 234 are reflected throughout the reflection hub 222, such that the reflected light beams 232 and 234 are reflected off of the intermediate section 228. Some of the scattered light beams 232 are reflected into the light channels 202, 204, 206, 208, and 210 and other light beams 234 are reflected to the proximate end 224. As can be seen, the light beams which reach the proximate end 224, e.g. light beam 234, are reflected back towards the distal end 226. The light will continue to bounce throughout the reflection hub 222 until the light beams fade or are received by the communication modules.

It is noted that the reflection hub 222 and the light channels 202, 204, 206, 208, and 210 are constructed and configured to minimize or eliminate external influences, such as outside light or heat. Thus, the outer surfaces of reflection hub and/or the light channels may be coated with a material sufficient to keep light or heat from entering the reflection hub.

It is envisioned that the reflection hub 222 may be used in various types of communication systems. In these systems, the amount of communication modules communicating with one another is variable. Thus, in some embodiments, the proximate end 224 can be configured to receive a plug or dummy light channel when the amount of communication modules communicating on the communication system is less than the amount of openings in the proximate end 224. The plug or dummy channel can be made of a reflective coating such that the inner surfaces thereof, i.e. those exposed inside the reflection hub 222 can, can reflect light beams throughout the reflection hub 222.

Figure 3A:
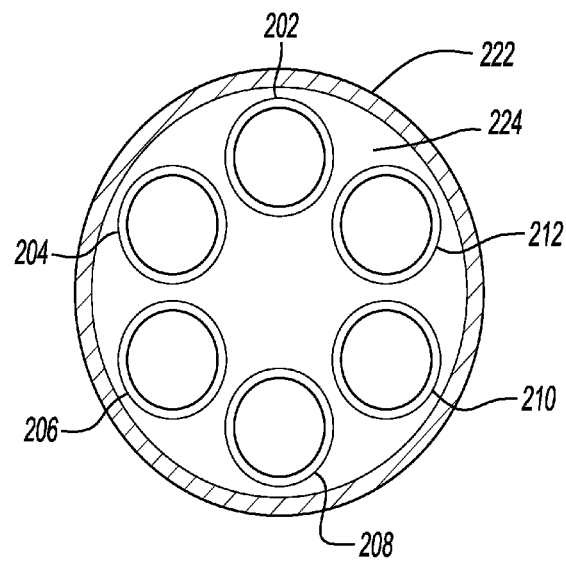
FIGS. 3A and 3B are perspective views of exemplary configurations of light channels arranged at a proximate end of a reflection hub in accordance with the teachings of the present disclosure.
Figure 3B:
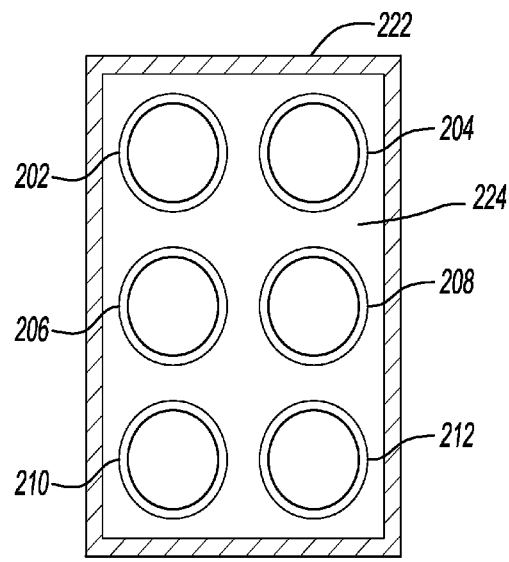

FIGS. 3A and 3B illustrate exemplary configurations of the light channels 202, 204, 206, 208, 210, and 212 arranged at the proximate end 224 of the reflection hub 222, as observed from inside the reflection hub 222. In FIG. 3A, the light channels 202, 204, 206, 208, 210, and 212 are arranged in a circular configuration. The light channels 202, 204, 206, 208, 210, and 212 are received by the proximate end 224 of the reflection hub 222.

In FIG. 3B the light channels 202, 204, 206, 208, 210, and 212 are arranged in a rectangular configuration. The light channels 202, 204, 206, 208, 210, and 212 are received by the proximate end 224 of the reflection hub 222. It is appreciated that any other suitable configuration can be used, e.g. an in-line configuration and the FIGS. 3A and 3B are provided to show exemplary configurations of the proximate end 224.

Figure 4:
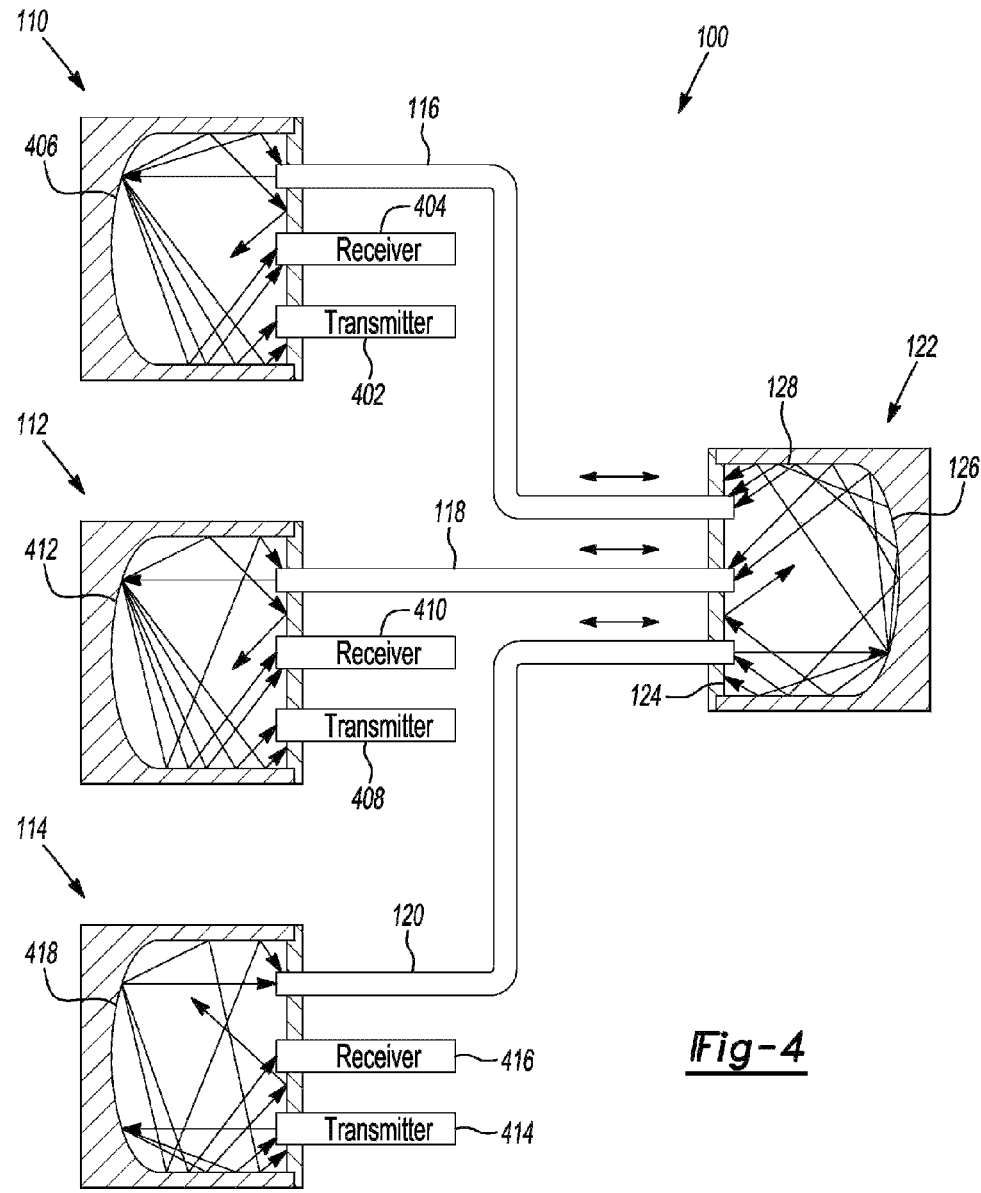
FIG. 4 illustrates an exemplary configuration of communication modules of the optical communication system in accordance with the teachings of the present disclosure.

As previously discussed, a plurality of communication modules 110, 112, and 114 can communicate via the optical communication system 100. FIG. 4 illustrates the optical communication system 100 of FIG. 1 with exemplary communication modules 116, 118, and 120 being depicted in greater detail. For instance, the first communication module 110 is comprised of a first transmitter 402 that transmits optical signals, a first receiver 404 that receives optical signals, a first reflection chamber 406 that reflects optical signals originating from or received by the first communication module 110, and a first light channel 116 that provides a medium for optical signals to travel through. It is appreciated that the second and third communication modules 112 and 114 can have similar configurations.

The transmitters 402, 408, and 414 are light emitting devices which communicate optical signals in the form of light pulses. It is envisioned that any suitable light emitting device can be used. For instance, the transmitters may include an LED or a laser diode that generates the optical signal. The receivers 404, 410, and 416 can be any devices suitable to receive an optical signal and to convert the optical signal into an electronic signal. For instance, the receivers 404, 410, and 416 can include a photodetector, such as a photodiode.

In some embodiments, each communication module 110, 112, and 114 will have a wavelength or range of wavelengths associated therewith, such that the transmitter of a particular communication module will transmit an optical signal having a wavelength corresponding to the particular communication module. For instance, the transmitter 402 of the first communication module 110 can transmit red light, while the transmitter 408 of the second communication module 112 can transmit blue light. As will be discussed, the implementation of predetermined wavelengths or wavelength ranges allows a receiver to determine the transmission source based on the wavelength.

The transmitters 402, 408, and 414 are configured to receive a plurality of data packets to be transmitted to a particular receiver or receivers. An exemplary data packet will include a header, a payload, i.e. the data to be transmitted to another device or component, and a check sum that is used to verify that the transmitted data has not been corrupted. An exemplary header can include information regarding the data packets itself. An exemplary header will include the destination of the data packet. As has been mentioned and will be discussed, when a transmitter transmits a data packet, the optical signal is received by all of the communication modules connected to a corresponding reflection hub. In essence, the transmitting transmitter will broadcast the data packet or data packets to all of the connected communication modules. The destination field of the header will indicate to the receivers of the connected communication modules whether the data packet was intended for each receiver.

It is envisioned that in some embodiments, multiple destinations can be included in the header such that multicast-like functionality can be supported as well. In these embodiments, a transmitter can transmit a data packet to multiple destinations by designating the multiple destinations in the destination field of the header. In some embodiments, the header also contains information such as the source of the transmission, a protocol used to format the payload, and other additional data relating to the transmission or formatting of the data packet.

The transmitters 402, 408, and 414 transmit the data packets in the form of an optical signal to the communication modules 110, 112, and 114 by way of the reflection hub 122. Typically, the transmitter 402, 408, or 414 will receive a data packet from a transmission buffer (not shown). The data packet is then transmitted by the transmitter 402, 408, or 414 in a predetermined order, e.g. in the order of the data packets in the transmission buffer. To transmit a data packet, the first transmitter 402 emits the optical signal representing the data packet in the form of light pulses, whereby the data packets being transmitted are encoded in the optical signal.

The optical signal emitted from the first transmitter is scattered off of the distal end of the first reflection chamber 406 in a manner similar to that described above and with respect to the reflection hub 122. It is noted that the reflection chambers 406, 412, and 416 are substantially similar in structure to the reflection hub 122. For instance, the proximate end of the reflection hub 406 of the first communication module 110 is configured to receive the first transmitter 402, the first receiver 404, and the first light channel 116. The transmitter emits the optical signal, which is reflected off of the distal end of the first reflection chamber 406. The scattered light beams are reflected into the first light channel 116, the first receiver 404, and the first transmitter 402. As will be discussed, the receivers 404, 410, and 416 can be configured to determine the source of the light, and as such will disregard the optical signals originating from their respective transmitters 402, 408, and 414. One or more of the light beams are reflected into the first light channel 116, as well. The light beam is channeled through the light channel 116 and into the reflection hub 122. The light beam is reflected off of the distal end 126 of the reflection hub 122 and scattered into a plurality of light beams. As described above, a subset of the plurality of scattered light beams are reflected into the light channels 116, 118, and 120. The light beams are then channeled to the reflection chambers 406, 412, and 418 of the respective light channels 116, 118, and 120 via the light channels 116, 118, and 120.

The light channeled to the communication modules 110, 112, and 114 is scattered throughout the respective light chambers, whereby the light beams, i.e. the optical signal, are received by each receiver 404, 410, and 416. As discussed, the receivers 404, 410, and 416 can be any device suitable to receive the optical signal and to generate an electric signal corresponding to the optical signal. Exemplary receivers 404, 410, and 416 may include a p-n photodiodes, a p-i-n photodiodes, and/or avalanche photodiodes. Once the receiver 404, 410, or 416 converts the optical signal to an electronic signal, the receiver 404, 410, or 416 can determine whether the packet was intended for the receiver 404, 410, or 416.

Figure 5:
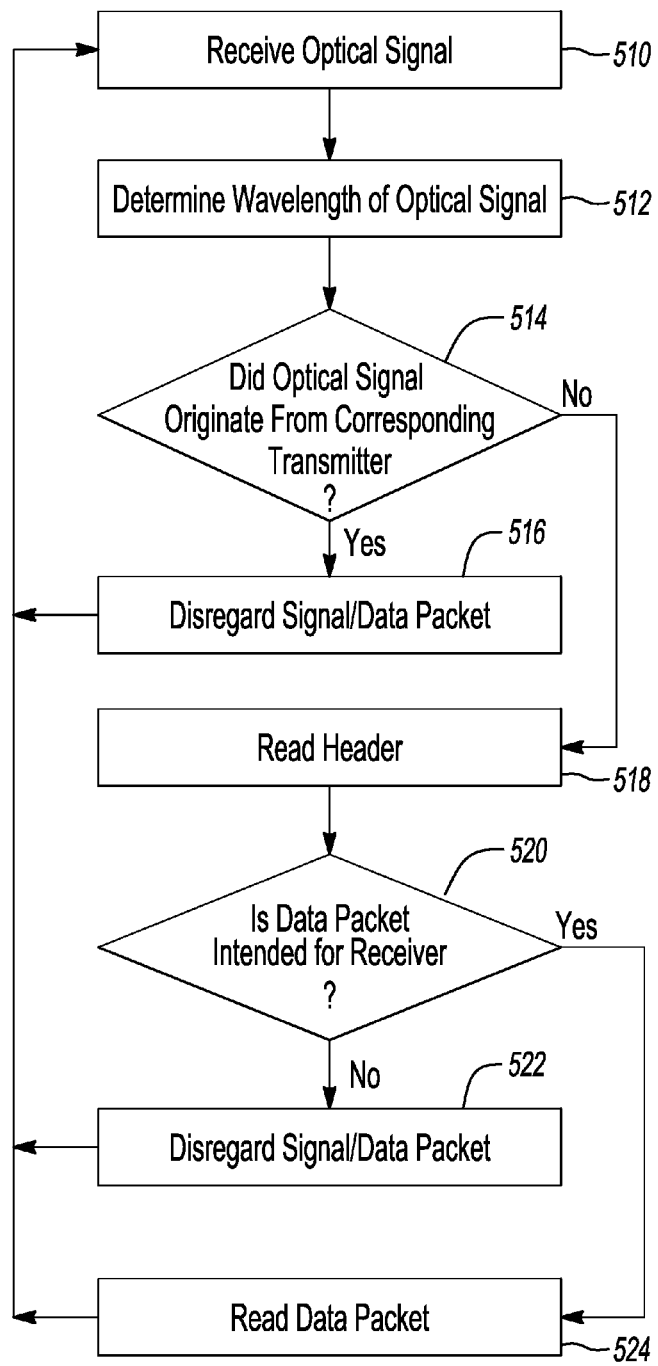
FIG. 5 illustrates an exemplary method performed by a receiver of an optical signal in accordance with the teachings of the present disclosure.

FIG. 5 illustrates an exemplary method that can be executed by a receiver to determine whether to disregard an optical signal or keep the data packets contained therein. As mentioned, each receiver 404, 410, and 416, will receive the optical signal, as shown at step 510. Upon receiving the signal, each of the receivers 404, 410, or 416 can make sure that the signal was not originated by its corresponding transmitter by determining the wavelength of the received signal, as shown at steps 512 and 514. As discussed, each transmitter will transmit a unique wavelength, such that when a receiver receives the optical signal it will determine the wavelength. The receiver can use a look up table or other suitable means to determine which transmitter the received optical signal corresponds to. In some embodiments, the receiver may know only the wavelength range of its corresponding transmitter, such that if the wavelength is not within the range, the receiver determines that the signal is received from a different communication module. This can also be achieved by integrating a filter in the receiver which filters out optical signals having wavelengths corresponding to its transmitter. Furthermore, multiple filters can be used in the receiver to separate two or more optical signals that are received at the same time.

If the receiver determines that the optical signal originated from the corresponding transmitter, the receiver will disregard the signal, as shown at step 516. If, however, the optical signal originated from a different communication module, then the receivers will decode at least a portion of the signal. As discussed, the data packets are encoded in the optical signal and the data packets contain a header with a destination field. The receivers will decode the optical signal to read the destination field in the header, as shown at step 518. Based on the destination field of the header, the receivers will determine if they are the intended recipient of the data packet, as shown at step 520. If the optical signal is not intended for the receiver, the data packet is disregarded, as shown at step 522. If the optical signal is intended for the receiver, the data packet is read and the appropriate course of action is taken, as shown at step 524. It is appreciated that the foregoing method is merely exemplary and variations thereof can be implemented by the receivers.

The disclosed optical system 100 and variations thereof can be used in a number of different applications. As discussed, the optical communication system 100 can be implemented as a communication bus in a vehicle. For example, hybrid and electric vehicles are becoming more widespread. These types of vehicles require real-time power control, which requires lots of data at multiple devices of the vehicle. For instance, data is shared between the motors of each wheel to provide a smooth feeling operation. Data is shared to provide the driver with the appearance that the wheels are pulling in sync. The requisite amount of torque on each wheel, however, may differ and the motors of the vehicle need to be aware of what the other motors are doing to provide the real-time power control. Thus, each motor will have a communication module corresponding thereto, and the motors, as well as other devices of the vehicle can communicate with one another by transmitting optical signals to one another via a reflection hub.

The disclosed optical communication system 100 can also be used in a vehicle audio/visual system. More complex audio/visual systems display complex screens and videos on the screen of the audio/visual system. To provide an appearance of real-time updating in the screens, large amounts of data are provided from various vehicle components, e.g. a GPS system, to the audio-visual system. Thus, the optical communication system 100 can link various components of the audio/visual system and the peripheral devices to allow for much faster communication between the devices.

As discussed above, the optical communication system 100 can also be adapted to effectuate communication between devices in a local area network (LAN). Traditional LANs utilize Ethernet cable to effectuate communication within a network by way of one or more routers. The optical communication system 100 described above can replace Ethernet or other optical communication systems to provide for a faster LAN. Each device in the network requires an optical port so that data can be routed throughout the LAN via the reflection hub.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

What is claimed is:

1. An optical communication system comprising:
   a plurality of communication modules, each communication module operable to receive and transmit optical signals via a light channel, each communication module including a transmitter that transmits optical signals, a receiver that receives optical signals, and a reflection chamber that reflects optical signals from the light channel to the receiver and from the transmitter to the light channel; and
   a reflection hub having a diffusive surface at a distal end, wherein the reflection hub receives the light channels of the plurality of communication modules at a proximate end of the reflection hub;
   wherein when one of the plurality of communication modules transmits an optical signal through a corresponding light channel, the optical signal is scattered off of the diffusive surface of the reflection hub into the light channels corresponding to the other of the communication modules of the plurality of communication modules, such that the transmitting communication module broadcasts the optical signal to the plurality of communication modules.

2. The optical communication system of claim 1 wherein the distal end is concave with respect to the proximate end.

3. The optical communication system of claim 1 wherein the reflection chamber of each communication module includes a diffusive surface at a distal thereof, wherein each reflection chamber receives a corresponding light channel, a corresponding transmitter, and a corresponding receiver at a proximate end of the reflection chamber.

4. The optical communication system of claim 1 wherein each communication module has a different wavelength associated therewith.

5. The optical communication system of claim 4 wherein the plurality of communication modules each identify a source of a received optical signal based on the wavelength of the received optical signal.

6. The optical communication system of claim 4 wherein when two or more optical signals transmitted from different communication modules are received by one of the plurality of communications modules, the receiving communication module differentiates the two or more optical signals based on the wavelengths of the two or more optical signals.

7. The optical communication system of claim 1 wherein a transmitting communication module transmits a data packet using the optical signal, wherein the data packet includes a destination identifier of the data packet which identifies an intended communication module of the plurality of communication modules.

8. The optical communication system of claim 7 wherein each of the plurality of communication modules receive the data packet, and the intended communication module determines that the data packet is intended for the intended communication module based on the destination identifier of the data packet.

9. An optical communication system comprising:
   a first communication module operable to receive and transmit optical signals via a first light channel, the first communication module includes a first transmitter that transmits optical signals, a first receiver that receives optical signals, and a first reflection chamber that reflects optical signals from the first light channel to the first receiver and from the first transmitter to the first light channel;
a second communication module operable to receive and transmit optical signals via a second light channel, the second communication module includes a second transmitter that transmits optical signals, a second receiver that receives optical signals, and a second reflection chamber that reflects optical signals from the second light channel to the second receiver and from the second transmitter to the second light channel;
a third communication module operable to receive and transmit optical signals via a third light channel, the third communication module includes a third transmitter that transmits optical signals, a third receiver that receives optical signals, and a third reflection chamber that reflects optical signals from the third light channel to the third receiver and from the third transmitter to the third light channel; and
a reflection hub having a diffusive surface at a distal end of the reflection hub and receiving the first light channel, the second light channel and the third light channel at a proximate end of the reflection hub;
wherein when the first communication module transmits an optical signal through the first light channel, the optical signal is scattered off of the diffusive surface of the reflection hub and into the first light channel, the second light channel and third light channel, such that the optical signal is broadcast to the first communication module, the second communication module and the third communication module.

10. The optical communication system of claim 9 wherein the first reflection chamber includes a diffusive surface at a distal end thereof, wherein the first reflection chamber receives the first light channel, the first transmitter, and the first receiver at a proximate end of the first reflection chamber.

11. The optical communication system of claim 9 wherein the first communication module has a first predetermined wavelength associated therewith, the second communication module has a second predetermined wavelength associated therewith, and the third communication module has a third predetermined wavelength associated therewith, such that the first, second and third predetermined wavelengths have different values.

12. The optical communication system of claim 11 wherein the first, second and third communication modules are operable to identify a source of a received optical signal based on the wavelength of the optical signal.

13. The optical communication system of claim 11 wherein when the third communication module receives a first optical signal from the first communication module and a second optical signal from the second communication module, the third communication module differentiates the first optical signal and the second optical signal based on the wavelength of the first optical signal and the wavelength of the second optical signal.

14. The optical communication system of claim 9 wherein the first, second and third communication modules are each operable to encode a data packet in an optical signal, wherein the data packet includes a destination identifier in a header of the data packet which identifies one or more intended recipients of the data packet and wherein each of the first, second, and third communication modules receive the data packet, and the intended recipient determines that the data packet is intended for the intended recipient based on the destination identifier of the data packet.

15. A reflection hub for enabling communication between a plurality of communication modules that transmit and receive optical signals, comprising:
a proximate end that receives from each of the plurality of communication modules a corresponding light channel through which the optical signals travel, the proximate end including a light absorbing layer that absorbs optical signals that are reflected off the distal end and do not enter a light channel;
a intermediate section having a reflective surface; and
a distal end having a diffuse reflective surface, such that when an optical signal is received from a transmitting communication module of the plurality of communication modules via a corresponding light channel, the optical signal is scattered off of the distal end and into corresponding light channels of other communication modules of the plurality of light channels.

16. The reflection hub of claim 15 wherein the distal end is semi-spherical and concave with respect to the proximate end.

* * * * *